United States Patent [19]

Lustig et al.

[11] Patent Number: 5,256,351
[45] Date of Patent: * Oct. 26, 1993

[54] PROCESS FOR MAKING BIAXIALLY STRETCHED, HEAT SHRINKABLE VLDPE FILMS

[75] Inventors: Stanley Lustig, Park Forest; Nancy M. Mack, Chicago; Jeffrey M. Schuetz, Woodridge; Stephen J. Vicik, Darien, all of Ill.

[73] Assignee: Viskase Corporation, Chicago, Ill.

[*] Notice: The portion of the term of this patent subsequent to Dec. 31, 2008 has been disclaimed.

[21] Appl. No.: 779,675

[22] Filed: Oct. 21, 1991

Related U.S. Application Data

[60] Division of Ser. No. 501,986, Mar. 28, 1990, Pat. No. 5,059,481, which is a continuation of Ser. No. 384,589, Jul. 25, 1989, Pat. No. 4,976,898, which is a division of Ser. No. 42,087, Apr. 24, 1987, Pat. No. 4,863,769, which is a continuation of Ser. No. 745,236, Jun. 17, 1985, abandoned.

[51] Int. Cl.$^5$ .............................................. B29C 35/10
[52] U.S. Cl. .................................... 264/22; 264/514; 264/564; 264/567; 264/290.2
[58] Field of Search .................. 264/567, 564, 290.2, 264/514, 22; 425/133.1, 326.1

[56] References Cited

U.S. PATENT DOCUMENTS

| | | | |
|---|---|---|---|
| 3,424,649 | 1/1969 | Nyberg et al. | |
| 3,456,044 | 7/1969 | Pahlke | 264/25 |
| 3,555,604 | 1/1971 | Pahlke | |
| 3,645,992 | 2/1972 | Elston | 260/80.78 |
| 4,011,382 | 3/1977 | Levine et al. | 526/96 |
| 4,076,698 | 2/1978 | Anderson et al. | 526/348.6 |
| 4,188,350 | 2/1980 | Vicik et al. | 525/232 |
| 4,196,240 | 1/1980 | Lustig et al. | 428/35 |
| 4,198,256 | 4/1980 | Andrews et al. | 156/229 |
| 4,207,363 | 6/1980 | Lustig et al. | 428/35 |
| 4,212,961 | 7/1980 | Kobayashi et al. | 526/151 |
| 4,277,578 | 7/1981 | Yoshimura | 525/211 |
| 4,293,673 | 10/1981 | Hamer et al. | 526/88 |
| 4,302,566 | 11/1981 | Karol et al. | 526/125 |
| 4,322,514 | 3/1982 | Miyoshi et al. | 526/124 |
| 4,329,388 | 5/1982 | Vicik et al. | 428/216 |
| 4,330,639 | 5/1982 | Matsuura et al. | 525/240 |
| 4,335,224 | 6/1982 | Matsuru et al. | 525/240 |
| 4,349,648 | 9/1982 | Jorgensen et al. | 526/125 |
| 4,354,997 | 10/1982 | Mizutani et al. | 264/564 |
| 4,357,376 | 11/1982 | Nattinger et al. | 428/35 |
| 4,399,181 | 8/1983 | Yoshimura et al. | 428/213 |
| 4,404,342 | 9/1983 | Miyoshi et al. | 526/125 |
| 4,405,774 | 9/1983 | Miwa et al. | 526/348.2 |
| 4,415,718 | 11/1983 | Miyoshi et al. | 526/348.6 |
| 4,424,243 | 1/1984 | Nishimoto et al. | 428/36 |
| 4,429,079 | 1/1984 | Shibata et al. | 525/240 |
| 4,438,238 | 3/1984 | Fukushima et al. | 525/240 |
| 4,447,480 | 5/1984 | Lustig et al. | 428/35 |
| 4,456,646 | 6/1984 | Nishimoto et al. | 428/216 |

(List continued on next page.)

OTHER PUBLICATIONS

"Tafmer ® . . . A New-Type Elastomer as Plastics Modifying Agent, Supplied in Pellet Form", 7 pages (Aug. 1975, Mitsui Petrochemical Industries, Ltd.).

(List continued on next page.)

FOREIGN PATENT DOCUMENTS

| | | |
|---|---|---|
| 975280 | 8/1975 | Canada . |
| 982923 | 9/1976 | Canada . |
| 1106099 | 10/1981 | Canada . |
| 1197350 | 11/1985 | Canada . |
| 002606 | 2/1979 | European Pat. Off. . |
| 120503 | 4/1984 | European Pat. Off. . |
| 199871 | 7/1986 | European Pat. Off. . |
| 37907 | 8/1983 | Japan . |
| 8534 | 3/1987 | Japan . |
| 45306 | 8/1988 | Japan . |
| 2062 | 3/1989 | Japan . |
| 2063 | 3/1989 | Japan . |
| 3228 | 4/1989 | Japan . |
| 10339 | 7/1989 | Japan . |
| 6621 | 4/1990 | Japan . |
| 2034336 | 10/1979 | United Kingdom . |
| 2033911 | 10/1980 | United Kingdom . |
| 2034337 | 10/1980 | United Kingdom . |
| 2034723 | 10/1980 | United Kingdom . |
| 2036764 | 11/1980 | United Kingdom . |
| 2066274 | 10/1981 | United Kingdom . |
| 2097324 | 11/1982 | United Kingdom . |
| 2125417 | 10/1984 | United Kingdom . |
| 2131033 | 11/1984 | United Kingdom . |
| 2133020 | 11/1984 | United Kingdom . |
| 2154178 | 11/1985 | United Kingdom . |

*Primary Examiner*—Jeffery Thurlow
*Attorney, Agent, or Firm*—John C. LeFever

[57] ABSTRACT

A method of manufacturing heat-shrinkable, puncture resistant, biaxially stretched thermoplastic films from very low density polyethylene (VLDPE). The film may be entirely VLDPE or it may be multilayer with an oxygen barrier core layer formed of material such as a polyvinylidene chloride copolymer or an ethylene vinyl alcohol copolymer, and two outer layers. One of these outer layers may for example be a blend of ethylene vinyl acetate (EVA) and VLDPE, and the other outer layer may be EVA. The film may be fabricated into bags suitable for packaging food articles such as frozen poultry, primal meat cuts, and processed meat products. The bags have high shrink and improved toughness.

46 Claims, No Drawings

U.S. PATENT DOCUMENTS

| | | | |
|---|---|---|---|
| 4,469,752 | 9/1984 | Yoshimura et al. | 428/475.8 |
| 4,469,753 | 9/1984 | Yoshimura et al. | 428/475.8 |
| 4,482,687 | 11/1984 | Noshay et al. | 526/125 |
| 4,486,579 | 12/1984 | Machon et al. | 526/65 |
| 4,495,249 | 1/1985 | Ohya et al. | 428/516 |
| 4,505,969 | 3/1985 | Weiner | 428/213 |
| 4,508,842 | 4/1985 | Beran et al. | 502/112 |
| 4,542,886 | 9/1985 | Yoshimura et al. | 264/22 |
| 4,551,380 | 11/1985 | Schoenberg | 428/218 |
| 4,594,213 | 6/1986 | Ealer | 264/564 |
| 4,597,920 | 7/1986 | Golike | 264/22 |
| 4,600,616 | 7/1986 | Ohya et al. | 428/36 |
| 4,617,241 | 10/1986 | Mueller | 428/520 |
| 4,623,581 | 11/1986 | Hert | 428/220 |
| 4,640,856 | 2/1987 | Ferguson et al. | 428/36 |
| 4,668,575 | 5/1987 | Schinkel et al. | 428/349 |
| 4,668,752 | 5/1987 | Tominari et al. | 526/348.2 |
| 4,701,496 | 10/1987 | Yoshimura et al. | 525/240 |
| 4,832,897 | 5/1989 | Van Der Molen | 264/564 |
| 4,835,218 | 5/1989 | Yoshimura et al. | 525/98 |
| 4,894,107 | 1/1990 | Tse et al. | 156/229 |
| 4,913,977 | 4/1990 | Taka et al. | 428/516 |
| 4,976,898 | 12/1990 | Lustig et al. | 264/290.2 |
| 4,988,465 | 1/1991 | Lustig et al. | 264/290.2 |
| 4,988,783 | 1/1991 | Beran et al. | 526/129 |
| 4,997,690 | 3/1991 | Lustig et al. | 264/290.2 |
| 5,077,109 | 12/1991 | Lustig et al. | 264/564 |

OTHER PUBLICATIONS

"DSM Polymers International Stamylex Film Grades", 10 pages, undated document obtained from file History of U.S. Appln. Ser. No. 07/648,480 (Quacquarella).

"Cast Film", 12 pages, (DSM), undated document obtained from file History of U.S. Appln. Ser. No. 07/648,480 (Quacquarella).

"Introducing 'Very Low Density PE'", *Plastics Technology*, p. 113 (Sep., 1984).

"Now It's Very Low–Density Polyethylene", *Chemical Week*, p. 66 (Sep., 1984).

"Can 'VLDPE' Outperform EVA, Other Copolymers?", *Modern Plastics*, pp. 12,14 (Oct., 1984).

"New Kind of Polyethylene Combines Flexibility, Toughness, Heat Resistance", *Plastics Technology*, pp. 13,15 (Oct., 1984).

"UC Researchers Smash 0.915 PE Density Mark", *Plastics World*, pp. 8–9 (Oct., 1984).

"Ultralow Density PE's are Tough, Flexible, Versatile", *Plastics World*, p. 86 (Oct., 1984).

Kurtz, S. J. "VLDPE: A Break–through In flexible Linear Polyethylene", *ANTEC' 85, Conference Proceedings for the Society of Plastic Engineers, Inc. 43rd Annual Technical Conference*, pp. 463–466 (Apr. 29–May 2, 1985).

"VLDPE Plugs a Gap in PE's Density Spectrum", *Plastics Engineering*, pp. 59–62 (Sep., 1985).

Cady L. D. "Ultra Low–Density Polyethylene" *Modern Plastics Encyclopedia, 1989*, p. 66 (Oct., 1989).

"Something New in Polyethylene: Linear Low–Density PE", *Plastics World*, p. 86 (Dec., 1979).

"New Family of Resins Hits Market", *The Journal of Commerce*, p. 22B (Sep. 12, 1984).

"Union Carbide", *Chemical Engineering*, p. 42 (Oct., 1984).

"Polyethylene Producers Face Tough Times", *European Chemical News*, pp. 13–14 (Dec. 16, 1985).

"TAFMER 'P' A New–Type Elastomer as Plastics Modifying Agent, Supplied in Pellet Form", pp. 1–6 (Aug., 1975) (Mitsui Petrochemical Industries, Ltd. brochure).

"TAFMER 'A' A New Polyolefin Resin with Excellent & Flexibility", pp. 10 (Jan., 1977) (Mitsui Petrochemical Industries, Ltd. brochure).

"Polyethylene, Linear Low–Density", *Package Engineering*, vol. 28, No. 4, pp. 76–78 (Mar., 1983) (Alternate title—The Packaging Encyclopedia, 1983).

J. P. Machon, "Actual and Potential Development of High Pressure Process for Linear Polyethylene", Golden Jubilee Conference Polyethylenes 1933–83 8–10 *Jun. 1983 Royal Lancaster Hotel*, London, pp. B2.5.1–B2.5.8 (The Plastics and Rubber Institute).

K. G. Schurzky, "Design Parameters for LLDPE Film Resin Selection"1984 *Polymers, Laminations and Coatings Conference*, Book 1, pp. 7–10 (Proceedings of the Technical Association of the Pulp and Paper Industry (TAPPI).

Stamylex PE Linear Polyethylene for Cast Film Extrusion, 16 page document (DSM) (this document was obtained from the file history of U.S. Pat. No. 4,837,084. In the prosecution of the patent, the prosecuting attorney alleged a date of Feb., 1984 and the accuracy of this date had not be confirmed.

Resin Modifiers TAFMER, 20 pages (Mitsui Petrochemical Industries, Ltd. brochure) (Undated, Believed to have been received Dec. 1990).

*Ethylene/Alpha–Olefin Copolymer TAFMER A/P*, 11 pages (Mitsui Petrochemical Industries, Ltd. brochure) (Undated, Believed to have been received Dec. 1990).

OTHER PUBLICATIONS

L. I. Chriswell, "Modern Processes for the Manufacture of Polyethylene and Polypropylene", *Chemical Engineering Progress*, vol. 79, No. pp. 84–92 (Apr., 1983).

F. J. Karol, "The Polyethylene Revolution", *Chemtech*, pp. 222–228 (Apr., 1983).

B. K. Hunter et al., "The Preparation and Characterization of Homogeneous Copolymers of Ethylene and 1–Alkenes", *Journal of Polymer Science: Polymer Chemistry Edition*, vol. 22, pp. 1383–1392 (John Wiley & Sons, Inc., 1984).

R. Alamo et al., "Thermodynamic and Structural Properties of Copolymers of Ethylene," *J. Phys. Chem.*, vol. 88, pp. 6587–6595 (American Chemical Society, 1984).

H. Shigemoto, "Easy Feelable Lid Material", *Proceedings of Futur–Pak '91 Ninth International Ryder Conference on Food Packaging Innovations*, pp. 293–316 (Oct. 2–4, 1991).

PROCESS FOR MAKING BIAXIALLY STRETCHED, HEAT SHRINKABLE VLDPE FILMS

This application is a division of prior U.S. application Ser. No. 501,986 filed Mar. 28, 1990, and U.S. Pat. No. 5,059,481, which is a continuation of application Ser. No. 384,589 filed Jul. 25, 1989, now U.S. Pat. No. 4,976,898, which is a division of application Ser. No. 042,087 filed Apr. 24, 1987, now U.S. Pat. No. 4,863,769, which is a continuation of application Ser. No. 745,236 filed Jun. 17, 1985, now abandoned.

FIELD OF THE INVENTION

This invention relates to puncture resistant, heat-shrinkable films, and more particularly, to such films having high flexibility over a wide temperature range, and excellent stress crack resistance. The films contain very low density polyethylene copolymers.

BACKGROUND OF THE INVENTION

The packaging of food articles such as poultry, fresh red meat, and processed meat products requires tough, puncture resistant, yet flexible, film materials. It is also desirable that the film materials be suitable for use in fabricating bags for packaging such food articles by the shrink wrapping method. Generally, the shrink wrapping method is predicated upon the heat-shrinking property of the bag by placing a given food article or articles into the bag, and thereafter exposing the bag to a heat source such as a flow of hot air, infrared radiation, hot water, and the like, thereby causing the bag to shrink and come into intimate contact with the contours of the food article or articles. The packaged article prepared by this packaging method has an attractive appearance which adds to the commodity value of the wrapped article, its contents are kept in a hygienic condition, and it allows shoppers to examine the quality of the contents of the packaged article.

For example, in commercial poultry packaging operations, monolayer films made from polyethylene or ethylene-vinyl acetate copolymers, and multilayer films containing ethylene-vinyl acetate copolymers are utilized extensively. Likewise, in the packaging of fresh red meat and processed meat products, multilayer heat-shrinkable films containing ethylene-vinyl acetate copolymers in one or more layers of the films are commonly employed. Ethylene-vinyl acetate copolymers have been commonly employed in such applications because of their toughness and low temperature shrinking characteristics. However, film materials in one or more film layers which possess the shrinking characteristics of ethylene-vinyl acetate copolymers and which provide additional toughness are generally very expensive materials, such as ionomers or polyurethanes. Even tougher film materials are desired for varied packaging applications, but heretofore they have not been available.

In providing such film materials, however, it must be remembered that the film material must be stretchable in order to provide a shrinkable film that will heat-shrink within a specified range of percentages, e.g., from about 30 to 50 percent at 90° C. in both the machine and the transverse directions. Further, the film must be heat sealable in order to be able to fabricate bags from the film, and the heat sealed seams must not pull apart during the heat shrinking operation. In addition, the film must resist puncturing by sharp edges, such as bone edges, during the heat-shrinking operation; and there must be adequate adhesion between the several layers of a multilayer film so that delamination does not occur, either during the heat-shrinking operation, or during exposure of the film to the relatively high temperatures that may be reached during shipping and storage of the film in the summertime.

Accordingly, although the known films meet many of the requirements for packaging applications, the need still exists for improved heat-shrinkable films and bags fabricated therefrom.

SUMMARY OF THE INVENTION

In accordance with the present invention, there is provided a biaxially stretched, heat-shrinkable, thermoplastic film comprising very low density polyethylene copolymer. The very low density polyethylene polymer comprises ethylene copolymerized with higher alpha olefins containing from 3 to 8 carbon atoms such as propylene, butene, pentene, hexene, heptene, and octene. These ethylene copolymers have a density below about 0.91 g/cm$^3$ and a 1% secant modulus below about 140,000 kPa, and preferably have a density of from about 0.86 g/cm$^3$ to about 0.91 g/cm$^3$ and a 1% secant modulus of from about 600 kPa to about 100,000 kPa. Further, the ethylene copolymers have a standard or normal load melt index of up to about 25.0 g/10 minutes, and preferably of from about 0.2 g/10 minutes to about 4.0 g/10 minutes. In addition, the ethylene copolymers have a high load melt index (HLMI) of up to about 1000 g/10 minutes.

DETAILED DESCRIPTION OF THE INVENTION

More particularly, the ethylene copolymers employed in the film materials of the instant invention are preferably prepared in a fluidized bed polymerization process by continuously contacting, in such fluidized bed, at a temperature of from 10° C. up to 80° C., a gaseous mixture containing (a) ethylene and at least one higher alpha olefin in a molar ratio of such higher alpha olefin to ethylene of from 0.35:1 to 8.0:1, and (b) at least 25 mol percent of a diluent gas, with a catalyst composition prepared by forming a precursor composition from a magnesium compound, titanium compound, and electron donor compound; diluting said precursor composition with an inert carrier; and activating the diluted precursor composition with an organoaluminum compound.

Fluid bed reactors suitable for continuously preparing ethylene copolymers have been previously described and are well known in the art. Fluid bed reactors useful for this purpose are described, e.g., in U.S. Pat. Nos. 4,302,565 and 4,302,566. Said patents likewise disclose catalyst compositions suitable for preparing such copolymers.

In order to produce ethylene copolymers having a density below 0.91 g/cm$^3$ by means of a fluid bed process, it is necessary to employ gaseous reaction mixtures containing higher amounts of higher alpha olefin comonomer vis-a-vis the amount of ethylene employed, than are employed to produce copolymers having a density greater than 0.91 g/cm$^3$. By the addition of progressively larger amounts of such higher olefin to the mixture, copolymers having progressively lower densities are obtained at any given melt index. The amount of higher olefin needed to achieve copolymers of a given density will vary from olefin to olefin, under the same conditions, with larger amounts of such higher olefin required as the number of carbon atoms in the olefin decreases. Generally, in order to produce copolymers having a density of less than 0.91 g/cm$^3$, it is necessary to employ reaction mixtures containing such higher olefin and ethylene in a molar ratio of higher olefin to ethylene of at least 0.35:1. Usually, mixtures containing such higher olefin and ethylene in a molar ratio of from 0.35:1 to 8.0:1 are employed for this purpose, with molar ratios of from 0.6:1 to 7.0:1 being preferred.

The higher alpha olefins which can be polymerized with ethylene to produce the low density, low modulus copolymers of the present invention can contain from 3 to 8 carbon atoms. These alpha olefins should not contain any branching on any of their carbon atoms closer than two carbon atoms removed from the double bond. Suitable alpha olefins include propylene, butene-1, pentene-1, hexene-1, 4-methylpentene-1, heptene-1 and octene-1. The preferred alpha olefins are propylene, butene-1, hexane-1, 4-methylpentene-1 and octene-1.

If desired, one or more dienes, either conjugated or non-conjugated, may be present in the reaction mixture. Such dienes may be employed in an amount of from 0.1 mol percent to 10 mol percent of the total gaseous mixture fed to the fluid bed, and are preferably present in an amount of from 0.1 mol percent to 8 mol percent. Such dienes may include, for example butadiene, 1,4-hexadiene, 1,5-hexadiene, vinyl norbornene, ethylidene norbornene and dicyclopentadiene.

In order to prevent the formation of polymer agglomerates and sustain polymerization on a continuous basis, when employing reaction mixtures containing the high ratios of higher alpha olefin comonomer to ethylene which are required to produce the desired copolymers having a density below 0.91 g/cm$^3$, it has been found necessary to dilute the reaction mixture with a large quantity of a diluent gas. Dilution of the reaction mixture with a diluent gas in this manner serves to reduce the tackiness of the polymers produced, which is the main cause of such agglomeration. Ordinarily the diluent gas should make up at least 25 mol percent of the total gaseous mixture fed to the fluid bed in order to prevent such agglomeration. Preferably, the gaseous mixture contains from 33 mol percent to 95 mol percent of such gas, and most preferably from 40 mol percent to 70 mol percent. By a "diluent" gas is meant a gas which is nonreactive under the conditions employed in the polymerization reactor, i.e., does not decompose and/or react with the polymerizable monomers and the components of the catalyst composition under the polymerization conditions employed in the reactor, other than to terminate polymer chain growth. In addition, such gas should be insoluble in the polymer product produced so as not to contribute to polymer tackiness. Among such gases are nitrogen, argon, helium, methane, ethane, and the like.

Hydrogen may also be employed as a diluent gas. In such event, the diluent serves not only to dilute the reaction mixture and prevent polymer agglomeration, but also acts as a chain transfer agent to regulate the melt index of the copolymers produced. Generally, the reaction mixture contains hydrogen in an amount sufficient to produce a hydrogen to ethylene mol ratio of from 0.01:1 to 0.5:1. In addition to hydrogen, other chain transfer agents may be employed to regulate the melt index of the copolymers.

The gaseous reaction mixture should, of course, be substantially free of catalyst poisons, such as moisture, oxygen, carbon monoxide, carbon dioxide, acetylene and the like.

In addition to diluting the reaction mixture with a diluent gas, it is necessary to maintain a relatively low temperature in the reactor in order to prevent polymer agglomeration and sustain polymerization on a continuous basis. The temperature which can be employed varies directly with the concentration of diluent gas present in such mixture, with higher concentrations of diluent gas permitting the use of somewhat higher temperatures without adverse effects. Likewise, the lower the concentration of the higher alpha olefin comonomer in the reaction mixture vis-a-vis the ethylene concentration, i.e., the higher the density and modulus of the copolymer being produced, the higher the temperature which can be employed. Generally, however, in order to continuously produce copolymers having a density below 0.91 g/cm$^3$ and a 1% secant modulus below 140,000 kPa while at the same time preventing polymer agglomeration, the temperature should not be permitted to rise above 80° C. On the other hand, the temperature employed must be sufficiently elevated to prevent substantial condensation of the reaction mixture, including diluent gas, to the liquid state, as such condensation will cause the polymer particles being produced to cohere to each other and likewise aggravate the polymer agglomeration problem. This difficulty is normally associated with the use of alpha olefins having 5 or more carbon atoms which have relatively high dew points. While some minor condensation is tolerable, anything beyond this will cause reactor fouling. Usually temperatures of from 10° C. to 60° C. are employed to produce copolymers having a density of from 0.86 g/cm$^3$ to 0.90 g/cm$^3$ and a secant modulus of from 600 kPa to 100,000 kPa. More elevated temperatures of from 60° C. up to 80° C. are ordinarily employed in the production of copolymers having a density of from 0.90 g/cm$^3$ up to 0.91 g/cm$^3$ and a 1% secant modulus of from 100,000 kPa up to 140,000 kPa.

Pressures of up to about 7000 kPa can be employed in preparing the copolymers, although pressures of from about 70 kPa to 2500 kPa are preferred.

In order to maintain a viable fluidized bed, the superficial gas velocity of the gaseous reaction mixture through the bed must exceed the minimum flow required for fluidization and preferably is at least 0.2 feet per second above the minimum flow. Ordinarily the superficial gas velocity does not exceed 5.0 feet per second, and most usually no more than 2.5 feet per second is sufficient.

The catalyst compositions employed in preparing the copolymers are produced by forming a precursor composition from a magnesium compound, titanium compound, and electron donor compound; diluting said precursor composition with an inert carrier; and activating the diluted precursor composition with an organoaluminum compound.

The precursor composition is formed by dissolving at least one titanium compound and at least one magnesium compound in at least one electron donor compound at a temperature of from about 20° C. up to the boiling point of the electron donor compound. The titanium compound(s) can be added to the electron donor compound(s) before or after the addition of the magnesium compound(s), or concurrent therewith. The dissolution of the titanium compound(s) and the magnesium compound(s) can be facilitated by stirring, and in some instances by refluxing these two compounds in the electron donor compound(s). After the titanium compound(s) and the magnesium compound(s) are dissolved, the precursor composition may be isolated by crystallization or by precipitation with an aliphatic or aromatic hydrocarbon containing from 5 to 8 carbon atoms, such as hexane, isopentane or benzene. The crystallized or precipitated precursor composition may be isolated in the form of fine, free-flowing particles having an average particle size of from about 10 microns to about 100 microns after drying at temperatures up to 60° C.

About 0.5 mol to about 56 mols, and preferably about 1 mol to about 10 mols, of the magnesium compound(s) are used per mol of the titanium compound(s) in preparing the precursor composition.

The titanium compound(s) employed in preparing the precursor composition has the structure $$Ti(OR)_a X_b$$

wherein R is an aliphatic or aromatic hydrocarbon radical containing from 1 to 14 carbon atoms, or COR' where R' is an aliphatic or aromatic hydrocarbon radical containing from 1 to 14 carbon atoms.

X is selected from the group consisting of Cl, Br, I, and mixtures thereof.

a is 0, 1 or 2, b is 1 to 4 inclusive, and a+b=3 or 4.

Suitable titanium compounds include $TiCl_3$, $TiCl_4$, $Ti(OCH_3)Cl_3$, $Ti(OC_6H_5)Cl_3$, $Ti(OCOCH_3)Cl_3$ and $Ti(OCOC_6H_5)Cl_3$. $TiCl_3$ is preferred because catalysts containing this material show higher activity at the low temperatures and monomer concentrations employed in preparing the copolymers.

The magnesium compound(s) employed in preparing the precursor composition has the structure $$MgX_2$$

wherein X is selected from the group consisting of Cl, Br, I, and mixtures thereof.

Suitable magnesium compounds include $MgCl_2$, $MgBr_2$ and $MgI_2$. Anhydrous $MgCl_2$ is particularly preferred.

The electron donor compound(s) employed in preparing the precursor composition is an organic compound which is liquid at 25° C. and in which the titanium and magnesium compounds are soluble. The electron donor compounds are known as such, or as Lewis bases.

Suitable electron donor compounds include the alkyl esters of aliphatic and aromatic carboxylic acids, aliphatic ethers, cyclic ethers and aliphatic ketones. Among these electron donor compounds, those preferred are alkyl esters of saturated aliphatic carboxylic acids containing from 1 to 4 carbon atoms; alkyl esters of aromatic carboxylic acids containing from 7 to 8 carbon atoms; aliphatic ethers containing from 2 to 8 carbon atoms but preferably from 4 to 5 carbon atoms; cyclic ethers containing from 4 to 5 carbon atoms, but preferably mono- or di-ethers containing 4 carbon atoms; and aliphatic ketones containing from 3 to 6 carbon atoms, but preferably from 3 to 4 carbon atoms. The most preferred of these electron donor compounds include methyl formate, ethyl acetate, butyl acetate, ethyl ether, tetrahydrofuran, dioxane, acetone and methyl ethyl ketone.

After the precursor composition has been prepared, it is diluted with an inert carrier material by (1) mechanically mixing or (2) impregnating such composition into the carrier material.

Mechanical mixing of the inert carrier and precursor composition is effected by blending these materials together using conventional techniques. The blended mixture suitably contains from about 3 percent by weight to about 50 percent by weight of the precursor composition.

Impregnation of the inert carrier material with the precursor composition may be accomplished by dissolving the precursor composition in the electron donor compounds, and then admixing the support with the dissolved precursor composition to impregnate the support. The solvent is then removed by drying at temperatures up to about 85° C.

The support may also be impregnated with the precursor composition by adding the support to a solution of the chemical raw materials used to form the precursor composition in the electron donor compound, without isolating the precursor composition from said solution. The excess electron donor compound is then removed by drying at temperatures up to about 85° C.

When thus made as disclosed above, the blended or impregnated precursor composition has the formula $$Mg_m Ti(OR)_n X_p [ED]_q$$

wherein R is an aliphatic or aromatic hydrocarbon radical containing from 1 to 14 carbon atoms, or COR' wherein R' is also an aliphatic or aromatic hydrocarbon radical containing from 1 to 14 carbon atoms.

X is selected from the group consisting of Cl, Br, I, and mixtures thereof.

ED is an electron donor compound m is 0.5 to 56, but preferably 1.5 to 5,
n is 0, 1 or 2, p is 2 to 116, but preferably 6 to 14, and q is 2 to 85, but preferably 3 to 10.

Suitably, the impregnated carrier material contains from about 3 percent by weight to about 50 percent by weight, but preferably from about 10 percent by weight to about 30 percent by weight, of the precursor composition.

The carrier materials employed to dilute the precursor composition are solid, particulate, porous materials which are inert to the other components of the catalyst composition, and to the other active components of the reaction system. These carrier materials include inorganic materials such as oxides of silicon and/or aluminum. The carrier materials are used in the form of dry powders having an average particle size of from about 10 microns to about 250 microns, but preferably from about 20 microns to about 150 microns. These materials are also porous and have a surface area of at least 3 square meters per gram, and preferably at least 50 square meters per gram. Catalyst activity or productivity can apparently be improved by employing a silica support having average pore sizes of at least 80 Angstrom units, but preferably at least 100 Angstrom units. The carrier material should be dry, that is, free of absorbed water. Drying of the carrier material can be effected by heating, e.g., at a temperature of at least 600° C. when silica is employed as the support. Alternatively, when silica is employed, it may be dried at a temperature of at least 200° C. and treated with about 1 weight percent to about 8 weight percent of one or more of the aluminum activator compounds described below. Modification of the support with an aluminum compound in this manner provides the catalyst composition with increased activity and also improves polymer particle morphology of the resulting ethylene copolymers. Other organometallic compounds, such as diethylzinc, may also be used to modify the support.

To be useful in producing the ethylene copolymers, the precursor composition must be activated with a compound capable of transforming the titanium atoms in the precursor composition to a state which will cause ethylene to effectively copolymerize with higher alpha olefins. Such activation is effected by means of an organoaluminum compound having the structure $$Al(R'')_d X'_e H_f$$

wherein X' is Cl or OR'''.

R'' and R''' are saturated hydrocarbon radicals containing from 1 to 14 carbon atoms, which radicals may be the same or different.

e is 0 to 1.5,
f is 0 or 1, and
d+e+f=3.

Such activator compounds can be employed individually or in combination thereof and include compounds such as $Al(C_2H_5)_3$, $Al(C_2H_5)_2Cl$, $Al_2(C_2H_5)_3Cl_3$, $Al(C_2H_5)_2H$, $Al(C_2H_5)_2(OC_2H_5)$, $Al(i-C_4H_9)_3$, $Al(i-C_4H_9)_2H$, $Al(C_6H_{13})_3$ and $Al(C_8H_{17})_3$.

If desired, the precursor composition may be partially activated before it is introduced into the polymerization reactor. However, any activation undertaken outside of the polymerization reactor should be limited to the addition of an amount of activator compound which does not raise the molar ratio of activator compound electron donor in the precursor composition beyond 1.4:1. Preferably, when activation is effective outside the reactor in this manner, the activator compound is employed in an amount which will provide the precursor composition with an activator compound:electron donor molar ratio of from about 0.1:1 to about 1.0:1. Such partial activation is carried out in a hydrocarbon solvent slurry followed by drying of the resulting mixture to remove the solvent at temperatures of from about 20° C. to about 80° C., and preferably from about 50° C. to about 70° C. The resulting product is a free-flowing solid particulate material which can be readily fed to the polymerization reactor where the activation is completed with additional activator compound which can be the same or a different compound.

Alternatively, when an impregnated precursor composition is employed, it may, if desired, be completely activated in the polymerization reactor without any prior activation outside of the reactor, in the manner described in European patent publication No. 12,148.

The partially activated or totally unactivated precursor composition and the required amount of activator compound necessary to complete activation of the precursor composition are preferably fed to the reactor through separate feed lines. The activator compound may be sprayed into the reactor in the form of a solution thereof in a hydrocarbon solvent such as isopentane, hexane or mineral oil. This solution usually contains from about 2 weight percent to about 30 weight percent of the activator compound. The activator compound is added to the reactor in such amounts as to provide, in the reactor, a total aluminum:titanium molar ratio of from about 10:1 to about 400:1, and preferably from about 25:1 to about 60:1.

In the continuous gas phase fluid bed process, discrete portions of the partially activated or totally unactivated precursor composition are continuously fed to the reactors, together with discrete portions of the activator compound needed to complete the activation of the partially activated or totally unactivated precursor composition during the continuing polymerization reaction in order to replace active catalyst sites that are expended during the course of the reaction.

By operating under the polymerization conditions described herein, and more fully disclosed by F. J. Karol et al in U.S. Ser. No. 587,005 filed on Mar. 13, 1984 titled "Preparation of low density, low modulus ethylene copolymers in a fluidized bed", it is possible to continuously polymerize ethylene in a fluidized bed with one or more higher alpha olefins containing from 3 to 8 carbon atoms, and optionally also with one or more dienes, to produce ethylene copolymers having a density below 0.91 g/cm$^3$ and a 1% secant modulus below 140,000 kPa. By "continuously polymerize", as used herein, is meant the capability of uninterrupted polymerization for weeks at a time i.e., at least in excess of 168 hours and usually in excess of 1000 hours, without reactor fouling due to the production of large agglomerations of polymer.

The copolymers produced in accordance with the aforedescribed process usually have a density of from 0.86 g/cm$^3$ to 0.90 g/cm$^3$. and a 1% secant modulus of from 600 kPa to 100,000 kPa. Such copolymers contain no more than 94 mol percent of polymerized ethylene and at least 6 mol percent of polymerized alpha olefin containing from 3 to 8 carbon atoms and, optionally, polymerized diene. When polymerized diene is present, the polymer contains from 0.01 mol percent to 10 mol percent of at least one such diene, from 6 mol percent to 55 mol percent of at least one polymerized alpha olefin containing from 3 to 8 carbon atoms, and from 35 mol percent to 94 mol percent of polymerized ethylene.

The molar ratios of propylene to ethylene which must be employed in the reaction mixture to produce copolymers having a given propylene content are illustrated in Table 1 below. When alpha olefins higher than propylene are employed, like results can be obtained with lower ratios of such higher alpha olefin to ethylene in the reaction mixture.

TABLE 1

| $C_3H_6/C_2H_4$ Ratio In Reaction Mixture | Mol % $C_3H_6$ In Copolymer | Mol % $C_2H_4$ In Copolymer |
|---|---|---|
| 0.7 | 6 | 94 |
| 1.5 | 12 | 88 |
| 3.0 | 25 | 75 |
| 6.0 | 50 | 50 |
| 8.0 | 62 | 38 |

The ethylene copolymers produced in accordance with the aforedescribed process have a standard or normal load melt index of from greater than 0 g/10 minutes to about 25.0 g/10 minutes, and preferably of from about 0.2 g/10 minutes to about 4.0 g/10 minutes. Such polymers have a high load melt index (HLMI) of from greater than 0 g/10 minutes to about 1000 g/10 minutes. The melt index of a polymer varies inversely with its molecular weight and is a function of the polymerization temperature of the reaction, the density of the polymer, and the hydrogen/monomer ratio in the reaction system. Thus, the melt index is raised by increasing the polymerization temperature, by increasing the ratio of higher alpha olefin to ethylene in the reaction system, and/or by increasing the hydrogen/monomer ratio.

The ethylene copolymers produced in accordance with the aforedescribed process have a melt flow ratio (MFR) of from about 22 to about 40, and preferably of from about 26 to about 35. Melt flow ratio is another means of indicating the molecular weight distribution ($M_w/M_n$) of a polymer. A MFR in the range of from about 22 to about 40 corresponds to a $M_w/M_n$ of from about 2.7 to about 6.5, and a MFR in the range of from about 26 to about 35 corresponds to a $M_w/M_n$ of from about 2.9 to about 4.8.

The ethylene copolymers produced, typically, have a residual catalyst content, in terms of parts per million of titanium metal, of less than 10 parts per million (ppm) at a productivity level of at least 100,000 pounds of polymer per pound of titanium. The copolymers are readily produced with such catalyst compositions at productivities of up to about 500,000 pounds of polymer per pound of titanium.

The ethylene copolymers are granular materials having an average particle size on the order of from about 0.01 to about 0.07 inches, and usually of from about 0.02 to about 0.05 inches in diameter. The particle size is important for the purpose of readily fluidizing the polymer particles in the fluid bed reactor. These granular materials also contain no more than 4.0 percent of fine particles having a diameter of less than 0.005 inches. The ethylene copolymers typically have a bulk density of from about 16 pounds per cubic foot to about 31 pounds per cubic foot.

The properties of the ethylene copolymers are determined by the following test methods:

Density

ASTM D-1505. A plaque is made and conditioned for one hour at 100° C. to approach equilibrium crystallinity. Measurement for density is then made in a density gradient column and density values are reported as grams/cm$^3$.

Melt Index (MI)

ASTM D-1238, Condition E. Measured at 190° C. and reported as grams per 10 minutes.

Flow Index (HLMI)

ASTM D-1238, Condition F: Measured at 10 times the weight used in the melt index test above.

Melt Flow Ratio (MFR)

Ratio of Flow Index: Melt Index

Bulk Density

ASTM D-1895, Method B. The resin is poured via a ⅜" diameter funnel into a 400 ml graduated cylinder to the 400 ml line without shaking the cylinder, and weighed by difference.

Average Particle Size

Calculated from sieve analysis data measured according to ASTM D-1921, Method A, using a 500 g sample. Calculations are based on weight fractions retained on the screens.

Molecular Weight Distribution, $M_w/M_n$

Gel Permeation Chromatography. Styrogel column packing: (Pore size packing sequence is $10^7$, $10^5$, $10^4$, $10^3$, 60A°). Solvent is perchloroethylene at 117° C. Detection: infrared at 3.45μ.

1% Secant Modulus

ASTM,D-638. Film strips 10"×0.5" are clamped at a 5 inch gauge length and deformed at a jaw separation rate of 0.2 in./min. A force elongation trace is determined. Secant modulus is the slope of a line drawn from the origin to the load at 1% deformation. Deformation is determined by crosshead position. Normalizing by the specimen's undeformed cross-sectional area, secant modulus is reported in kPa.

In general, it has been found that when the very low density ethylene copolymers are formed into films, and the films are biaxially stretched, the stretched films provide exceptionally high shrinkage values at elevated temperatures, for example, such as at about 90° C., compared to films made from ethylene-vinyl acetate copolymers. The biaxially stretched, very low density ethylene copolymer films of this invention heat-shrink from about 30 percent to about 50 percent at a temperature of about 90° C. in both the machine direction and transverse direction. Further, stretched films made from very low density ethylene copolymers have excellent tensile, elongation, and puncture toughness properties. Due to these properties, the films are improved materials for fabricating into bags for packaging food articles such as poultry, primal meat cuts, and processed meat products.

Illustrative, non-limiting examples of the features and practice of the invention are set out below. The parts and percentages set forth herein refer to parts by weight and percentages by weight, respectively,,unless specifically stated otherwise.

In the examples, the following test methods were used to determine the properties of the resins and the films described in Example 1. Tensile strength and elongation at break values were obtained pursuant to ASTM Method D-882, procedure A. Density values were obtained by ASTM Method D-1505. Dynamic puncture values were obtained by employing a Dynamic Ball Burst Tester, Model 13-8, manufactured by Testing Machines, Inc., Amityville, Long Island, N.Y. A special tip designed to simulate a sharp-boned surface was employed to replace the spherical-shaped impact head of the apparatus. This modified testing device measured energy in units of kilogram-centimeters.

Shrinkage values were obtained by measuring unrestrained shrink at 90° C. for five seconds. In more detail, a 1 or 2 liter beaker is filled with water which is heated to about 100° C. Four machine direction (MD) shrinkage test samples are cut to 12 cm. machine direction by 1.27 cm. transverse direction (TD). Four transverse direction shrinkage test samples are cut to 12 cm. transverse direction by 1.27 cm. machine direction. Both sets of samples are marked with a short cut exactly 10 cm. from one end for identification. The water bath temperature is brought to 90° C., and each sample is completely immersed in the water bath for five seconds and removed therefrom. After shrinking, the distance between the end of the sample and the 10 cm. mark is measured to the closest 0.1 cm. The difference between the final length and the original 10 cm. is multiplied by 10 to obtain the percent change. If the sample shrinks, the value is negative, and if the sample stretches, the value is positive. The average of the four samples is calculated for both of the machine direction and transverse direction samples.

EXAMPLE I

This example illustrates the comparative heat-shrinking properties of a very low density polyethylene (VLDPE) film made by (1) the free or simple bubble extrusion process, and by (2) the "double bubble" method described in Pahlke U.S. Pat. No. 3,555,604. The "double bubble" manufacturing method results in a film which has been biaxially stretched. More particularly, in the practice of the "double bubble" method, the primary tube (extruded film) is stretched in the machine direction, cooled, reheated and then stretched in the machine and transverse directions. More particularly, in the practice of the "double bubble" method, the primary tube (extruded film) is stretched in the machine direction, cooled, reheated, and then stretched in the machine and transverse directions.

The very low density polyethylene material employed to make the films had a density of about 0.906 g./cm$^3$, and a melt index of about 0.88 decigram per minute, and is available from Union Carbide Corporation, Danbury, Conn. under the designation UCAR® FLX DFDA-1137. The films made by the simple bubble extrusion process and by the "double bubble" method were evaluated for percent shrinkage at 85° C., 90° C., and 95° C. in accordance with the aforedescribed test method. The results of these evaluations are summarized below in Table 2.

TABLE 2

Percent Heat Shrinkage of Simple Bubble and Double Bubble Production Very Low Density Polyethylene

| Shrinkage Temperature (°C.) | Simple Bubble MD/TD (%) | Double Bubble MD/TD (%) |
|---|---|---|
| 85 | 2/3 | 42/45 |
| 90 | 3/3 | 52/53 |
| 95 | 3/3 | 58/58 |

It can be seen from the data in Table 2 that the film made from the very low density polyethylene material by the simple bubble extrusion process has very low heat shrinkage properties, whereas the film made by the "double bubble" method has exceptionally high shrinkage values for both the machine direction (MD) and the transverse direction (TD) samples.

EXAMPLE II

This example illustrates the comparative properties of a biaxially stretched very low density polyethylene (VLDPE) film, film A, with those of biaxially stretched films made from low density polyethylene (LDPE), film B; linear, low density polyethylene (LLDPE), film C; ethylene-vinyl acetate copolymer having a vinyl acetate content of 12 weight percent (EVA-12), film D; ethylene-vinyl acetate copolymer having a vinyl acetate content of 3 weight percent (EVA-3), film E; and an ethylene-methacrylic acid ionic copolymer (ionomer) having a melt flow index of about 1.3 g./10 min. and a specific gravity of about 0.94 g/cm$^3$, commercially available as Surlyn 1601 from E. I. duPont de Nemours and Co., Wilmington, Del., film F. Film A was made from a very low density ethylene copolymer having a density of about 0.90 g./cm$^3$, and a melt index of about 0.84 decigram per minute. The biaxially stretched monolayer films were made pursuant to the "double bubble" method described in Pahlke U.S. Pat. No. 3,555,604. The biaxially stretched films were evaluated for heat shrink properties, puncture resistance, tensile strength, and elongation. The results of these evaluations are summarized below in Table 3.

TABLE 3

Physical Properties of Biaxially Stretched Monolayer Films

| Film | Resin Type | Density | Melt Index | Melting Point (°C.) | Shrink % (at 90° C.) MD/TD | Tensile Strength (psi) | Elongation (%) | Puncture (kg-cm/mil) |
|---|---|---|---|---|---|---|---|---|
| A | VLDPE | 0.90 | 0.84 | 116 | 51/54 | 7650 | 400 | 2.4 |
| B | LDPE | 0.917 | 0.1 | 104 | 18/28 | 6700 | 225 | 0.9 |
| C | LLDPE | 0.918 | 0.65 | 118 | 18/25 | 7100 | 325 | 1.1 |
| D | EVA-12 | 0.940 | 0.25 | 98 | 37/46 | 7400 | 275 | 2.5 |
| E | EVA-3 | 0.921 | 0.25 | 104 | 23/35 | 8200 | 210 | 1.1 |
| F | IONOMER | 0.950 | 1.3 | 92 | 57/65 | 8600 | 110 | 1.3 |

It can be seen from the data in Table 3 that a biaxially stretched monolayer film made from VLDPE has exceptionally high shrinkage values at 90° C. in spite of a relatively high melting point as compared to EVA resins, and also substantially higher shrinkage values at 90° C. compared with LDPE and LLDPE. The data for films B, C, D, E and F show that the shrinkage values of the films generally decrease as the melting point of the resins increase, whereas although the melting point of the VLDPE resin (film A) is high, the film has high shrinkage values. In addition, a biaxially stretched monolayer film made from VLDPE has excellent tensile and elongation properties, and exceptional puncture toughness properties. That is, from the data in Table 3, it can be seen that a biaxially stretched monolayer film made from VLDPE has better elongation properties than LDPE, LLDPE, EVA-12, EVA-3, and the instant ionomer material. For example, the data shows that the VLDPE film may be stretched 400% or about four times its original length before it breaks. Thus, a biaxially stretched monolayer film made from VLDPE has the physical properties which are highly desirable for use as a heat-shrinkable bag for packaging frozen poultry, as well as other products.

EXAMPLE III

In this example, bags for packaging poultry were evaluated for shrink tunnel performance. All bags were made from films obtained pursuant to the method described in Pahlke U.S. Pat. No. 3,555,604. The bags designated sample A were made from a biaxially stretched monolayer film having a thickness of about 2.25 mils prepared from a VLDPE resin having a melt index of about 0.14 decigram per minute, and a density of about 0.90 g./cm$^3$. The bags designated sample B were conventional poultry bags employed as controls. The control bags were prepared from a biaxially stretched monolayer film having a thickness of about 2.25 mils made with a blend containing 85 percent by weight of an ethylene-vinyl acetate copolymer having a vinyl acetate content of 3 weight percent, and a melt index of 0.25 decigram per minute, and 15 percent by weight of a high density polyethylene having a melt index of about 0.15 decigram per minute and a density of about 0.953 gram per cubic centimeter.

The results of the visual screening evaluations are summarized below in Table 4.

TABLE 4

Monolayer Film Packaging Test (Shrink Tunnel Performance)
Film/Package Appearance After Shrink

| Shrink Tunnel Temperature | Package Appearance Property | Sample A | Sample B |
|---|---|---|---|
| 165° F | Shrinkage | 6 | 4 |
|  | Gloss | 7 | 9 |
|  | Haze | 5 | 9 |
| 175° F | Shrinkage | 7 | 5 |
|  | Gloss | 7 | 9 |
|  | Haze | 5 | 9 |
| 185° F | Shrinkage | 9 | 5 |
|  | Gloss | 7 | 9 |
|  | Haze | 5 | 9 |
| 195° F | Shrinkage | 9 | 6 |
|  | Gloss | 7 | 9 |
|  | Haze | 5 | 9 |
| 205° F | Shrinkage | 7 | 7 |
|  | Gloss | 7 | 9 |
|  | Haze | 5 | 9 |

1 = Poor
9 = Excellent: High Shrink, High Gloss, Low Haze
Values of at least 4 are considered acceptable.

The test results show that the sample A bags had substantially improved shrinkage properties compared to the sample B bags at shrink tunnel temperatures between 165° F. and 195° F., and similar properties at 205° F. However, their gloss and haze values are somewhat lower than those of the sample B bags, but these values are still acceptable.

EXAMPLE IV

In this example, heat-shrinkable biaxially stretched multilayer films were prepared for evaluation as bags for packaging primal meat cuts. The films were evaluated for shrink, tensile strength, elongation, and puncture resistance properties. The following resin materials were employed to make the films.

Ethylene-Vinyl Acetate (EVA) Copolymer 12 weight percent vinyl acetate, 0.25 melt index.

Polyvinylidene Chloride (PVDC) Copolymer 84 to 87 weight percent vinylidene chloride, 13 to 16 weight percent vinyl chloride.

Very Low Density Polyethylene (VLDPE) Copolymer

Ethylene copolymer having a density of 0.906 g/cm$^3$, and a melt index of 0.92 decigram per minute.

Table 5 summarizes the resin compositions employed to make the indicated biaxially stretched multilayer films.

TABLE 5

Multilayer Film Compositions

| Film | First Outer Layer (Bag Inner Layer) | Core Layer | Second Outer Layer (Bag Outer Layer) |
|---|---|---|---|
| A (Control) | EVA | PVDC | EVA |
| B | EVA | PVDC | 90% EVA |
|  |  |  | 10% VLDPE |
| C | EVA | PVDC | 75% EVA |
|  |  |  | 25% VLDPE |

The biaxially stretched multilayer films were produced pursuant to the process disclosed in U.S. Pat. No. 3,555,604 by coextrusion through a multilayer die and subsequent biaxial stretching of the primary tube- The resultant biaxially stretched films had an average total thickness of about 2.5 mils, wherein the first outer layer had an average thickness of about 1.5 mils, the core layer had an average thickness of about 0.35 mil, and the second outer layer had an average thickness of about 0.65 mil. The results of the aforementioned evaluations are shown below in Table 6.

TABLE 6

Physical Properties of Biaxially Stretched Multilayer Films

| Film | Shrink % at 90° C. MD/TD | Tensile Strength (psi) MD/TD | Elongation (%) MD/TD | Puncture (cm-kg/mil) |
|---|---|---|---|---|
| A | 38/51 | 6400/9000 | 195/175 | 1.4 |
| B | 34/53 | 6900/9200 | 210/180 | 1.5 |
| C | 41/52 | 7500/9500 | 240/195 | 1.8 |

It can be seen from the data in Table 6 that a biaxially stretched multilayer film comprising ethylene-vinyl acetate outer layer blends containing VLDPE have improved tensile strengths, ultimate elongation and puncture strength compared with an outer layer containing 100% ethylene-vinyl acetate copolymer. Thus, a biaxially stretched multilayer film made with blends of VLDPE in the outer layer has the properties which are highly desirable for use as a heat-shrinkable bag for packaging fresh red meat and processed meat products.

Therefore, the novel film compositions of this invention have been shown to possess the physical properties required for use in packaging food articles such as frozen poultry, primal meat cuts and processed meat products. Furthermore, the film compositions of the present invention also have the toughness required during the biaxial stretching process, in order to provide a substantially stable operation with few bubble breaks, while providing a film possessing the requisite physical properties with respect to shrinkage characteristics.

Accordingly, the film compositions of this invention comprise a biaxially stretched very low density polyethylene copolymer. A preferred biaxially stretched monolayer film composition comprises a very low density polyethylene copolymer having a density of between about 0.86 g./cm.$^3$ and about 0.91 g./cm.$^3$, and a melt index of up to about 25.0 g./10 minutes because such provides a film with improved shrinking properties. Such monolayer films are particularly suitable for use in fabricating heat-shrinkable bags for packaging poultry products.

In a further embodiment of the film compositions of this invention, the film composition comprises a biaxially stretched multilayer Eilm containing a very low density polyethylene copolymer having a density of between about 0.86 g./cm.$^3$ and about 0.91 g./cm.$^3$, and a melt index of up to about 25.0 g./10 minutes because these films have improved tensile strengths, ultimate elongation and puncture strength properties, and are heat-shrinkable. Such multilayer films are especially suitable for use in fabricating heat-shrinkable bags for packaging primal meat cuts and processed meats. For example, the multilayer film composition may comprise a first outer layer of an ethylene-vinyl acetate copolymer; a core layer of a barrier Eilm such as a polyvinylidene chloride copolymer or an ethylene-vinyl alcohol copolymer; and a second outer layer comprising a blend of an ethylene-vinyl acetate copolymer and from between about 5 weight percent and 25 weight percent, but preferably between about 10 weight percent and about 25 weight percent, of a very low density polyethylene polymer as described above.

In accordance with a preferred embodiment of this invention, the first outer layer of the multilayer film is an ethylene-vinyl acetate copolymer containing from about 9 to about 15 weight percent of vinyl acetate, based on the weight of the copolymer, said copolymer having a melt index of between about 0.1 and about 1.0 decigram per minute and being selected from the group consisting of (a) a single ethylene-vinyl acetate copolymer and (b) a blend of ethylene-vinyl acetate copolymers.

The second outer layer of the multilayer film of this invention comprises an ethylene-vinyl acetate copolymer selected from the group consisting of (a) an ethylene-vinyl acetate copolymer having a melt index of from about 0.1 to about 1.0 decigram per minute and a vinyl acetate content of from about 3 to about 18 weight percent, and preferably from about 10 to about 15 weight percent, based on the weight of said second ethylene-vinyl acetate copolymer, and (b) a blend of at least two ethylene-vinyl acetate copolymers, wherein one of said ethylene-vinyl acetate copolymers has a melt index of from about 0.1 to about 1.0 decigram per minute and a vinyl acetate content of from about 10 to about 18 weight percent, based on the weight of said copolymer, and the other ethylene-vinyl acetate copolymer has a melt index of from about 0.1 to about 1.0 decigram per minute and a vinyl acetate content of from about 2 to about 10 weight percent, based on the weight of said copolymer. The blend (b) of said at least two ethylene-vinyl acetate copolymers has a vinyl acetate content of from about 3 to about 18 weight percent, and preferably from about 10 to about 15 weight percent, based on the weight of said copolymers.

The heat-shrinkable films of this invention can be produced by known techniques. For example, the multilayer films may be prepared by co-extruding multiple layers into a primary tube, followed by the biaxial stretching of the tube by known techniques. The "double-bubble" technique disclosed in Pahlke U.S. Pat. No. 3,456,044, is particularly useful in preparing these films. In addition, after biaxial stretching, the films of this invention may be irradiated to a dosage level of between about 1 megarad and about 5 megarads, such as by passing the films through an electron beam irradiation unit.

The biaxially stretched, heat-shrinkable, thermoplastic monolayer film, when employed to fabricate bags for packaging frozen poultry, will generally have a thickness of from about 1.5 mils to about 2.75 mils. A film having a thickness of less than about 1.5 mils tends to be physically weak for use in the poultry packaging industry, while a film having a thickness greater than about 2.75 mils tends to cause clipping problems and loss of vacuum in the end use application. A film thickness range of between about 2.0 mils and about 2.4 mils is a preferred balance of these opposing considerations.

The biaxially stretched, heat-shrinkable, thermoplastic multilayer film will generally have a total thickness of from about 1.75 mils to about 3.0 mils. For example, when the multilayer film is a three-layer film, the first outer layer will normally have a thickness of from about 1.1 mils to about 1.6 mils, the core layer will normally have a thickness of from about 0.25 mil to about 0.45 mil; and the second outer layer will normally have a thickness of from about 0.4 mil to about 1.0 mil. The thickness of the first outer layer, which is the inner layer of the bag, should be within the aforementioned range because the sealing and processability properties of the film layer would otherwise be diminished. The thickness of the core layer should be within the above-indicated range because the film would provide inadequate barrier properties if the core layer thickness is less than about 0.25 mil. The upper limit of 0.45 mil for the core layer is primarily due to economic considerations. The thickness of the second outer layer, which is the outer layer of the bag, is selected in order to provide a total thickness of the multilayer Eilm in the range of from about 1.75 mils to about 3.0 mils. When the total film thickness of the multilayer film exceeds about 3.0 mils, clipping problems are encountered in that it is difficult to gather together the open end of a bag made therefrom. When the thickness of the multilayer film is less than about 1.75 mils, the bag will generally have diminished puncture resistance.

When the core layer of the multilayer film of this invention comprises a polyvinylidene chloride copolymer, it must contain at least 65 weight percent of vinylidene chloride and a maximum of 5 weight percent of plasticizer, based upon the weight of the polyvinylidene chloride copolymer. The remainder of the polyvinylidene chloride copolymer is preferably vinyl chloride, but it may also include acrylonitrile, an acrylate ester such as methyl methacrylate, or the like. More preferably, the polyvinylidene chloride copolymer will contain at least about 70 weight percent, and not more than about 95 weight percent, of polymerized vinylidene chloride because when the polyvinylidene chloride copolymer contains less than about 70 weight percent vinylidene chloride the oxygen barrier property of the copolymer is diminished. If the vinylidene chloride content is more than 95 weight percent, the polyvinylidene chloride copolymer is generally not extrudable. The polyvinylidene chloride copolymer preferably contains less than 5 weight percent plasticizer, and more preferably less than 4 weight percent plasticizer, the percentages being based on the weight of the total blend, including the polymer and all additives such as the plasticizer, in order to maximize the barrier properties of the thin film. Conventional plasticizers such as dibutyl sebacate and epoxidized soybean oil can be used.

After biaxial stretching by any suitable method well known in the art, in order to provide improved heat sealing characteristics thereto, the films of this invention are preferably irradiated to a dosage level of between about 1 megarad and about 5 megarads, and preferably between about 2 megarads and about 3 megarads, by a suitable method such as by employing an electron beam. Irradiation at a dosage level within this range is necessary in order to achieve improved heat sealing characteristics without film discoloration. That is, when the energy level is below the indicated range, the cross-linking obtained is not sufficient to improve the heat sealing characteristics of the films or to have any enhanced effect upon the toughness properties of the films. When the energy level is above the aforementioned range, film discoloration occurs due to degradation of some layers, particularly when a core layer of polyvinylidene chloride copolymer is present. Additionally, when the energy level of irradiation exceeds about 5 megarads, the degree of film shrinkage is significantly reduced, and further improvements in the heat sealing characteristics and toughness properties of the film are not achieved.

In another aspect of this invention, bags suitable for the shrink-packaging of food articles such as poultry, primal meat cuts, and processed meats are provided from the afore-described films. The bags are produced from the monolayer and multilayer films of this invention by heat sealing. For instance, if the films of this invention are produced in the form of tubular film, bags can be produced therefrom by heat sealing one end of a length of the tubular film or by sealing both ends of the tube end, then slitting one edge to form the bag mouth. If the films of this invention are made in the form of flat sheets, bags can be formed therefrom by heat sealing three edges of two superimposed sheets of film. When carrying out the heat sealing operation, the surfaces which are heat sealed to each other to form seams are the aforedescribed first outer layers of the multilayer films of the invention. Thus, for example, when forming a bag by heat sealing one edge of a length of tubular film, the inner surface of the tube, i.e., the surface which will be heat sealed to itself, will be the first outer layer of the film.

In general, various conventional additives such as slip agents, anti-blocking agents, and pigments can be incorporated in the films in accordance with conventional practice.

Although preferred embodiments of this invention have been described in detail, it is contemplated that modifications thereof may be made and some preferred features may be employed without others, all within the spirit and scope of the broad invention.

What is claimed is:

1. A method of manufacturing a heat-shrinkable, puncture resistant, biaxially stretched, thermoplastic film comprising the steps of extruding a primary tube having a transverse and a machine direction, said tube comprising a very low density polyethylene which is a linear polymer of ethylene and at least one alpha-olefin selected from the group consisting of butene-1, pentene-1, hexene-1, 4-methyl pentene-1, heptene-1 and octene-1, said copolymer having a density of from about 0.86 g/cm$^3$ to 0.91 g/cm$^3$ and a 1% secant modulus about below about 140,000 kPa; heating the very low density polyethylene primary tube; biaxially stretching the heated primary tube in the transverse and machine directions under conditions wherein the biaxially stretched tube is heat shrinkable from about 30% to about 50% at a temperature of about 90° C. in at least one of the transverse and machine directions.

2. A method according to claim 1 wherein said biaxially stretched tube is heat shrinkable from about 30% to about 50% at a temperature of about 90° C. in the transverse direction.

3. A method according to claim 1 wherein said biaxially stretched tube is heat shrinkable from about 30% to about 50% at a temperature of about 90° C. in the machine direction.

4. A method according to claim 1 wherein said biaxially stretched tube is heat shrinkable from about 30% to about 50% at a temperature of about 90° C. in both the transverse and machine directions.

5. A method according to claim 1 wherein the film comprises a monolayer film.

6. A method according to claim 1 wherein the film comprises a multilayer film.

7. A method according to claim 6 wherein the primary multilayer film is prepared by coextrusion.

8. A method according to claim 6 wherein at least one layer of said multilayer film comprises a blend of said very low density polyethylene and an ethylene-vinyl acetate copolymer.

9. A method according to claim 6 wherein the multilayer film comprises a first outer layer of an ethylene-vinyl acetate copolymer, a core layer comprising a barrier film, and a second outer layer comprising a blend of said very low density polyethylene and an ethylene-vinyl acetate copolymer.

10. A method according to claim 6 wherein said film is irradiated to a dosage level of between about 1 megarad and about 5 megarads.

11. A method according to claim 1 wherein the polyethylene copolymer has a standard load melt index of up to about 25.0 g/10 minutes.

12. A method according to claim 1 wherein the polyethylene copolymer has a high load melt index of up to about 1000 g/10 minutes.

13. A method according to claim 6 wherein the multilayer film has a thickness of from about 1.75 mils to about 3.0 mils.

14. A method according to claim 6 wherein at least one layer of said multilayer film comprises an oxygen barrier layer.

15. A method according to claim 14 wherein said oxygen barrier layer is a core layer.

16. A method according to claim 14 wherein said oxygen barrier layer comprises a copolymer of vinylidene chloride and at least one comonomer selected from the group consisting of vinyl chloride, acrylonitrile and an acrylate ester.

17. A method according to claim 14 wherein said oxygen barrier layer comprises a copolymer of vinylidene chloride and an acrylate ester wherein vinylidene chloride constitute at least 65 weight percent of the copolymer.

18. A method according to claim 14 wherein said oxygen barrier layer comprises a copolymer of vinylidene chloride and a vinyl chloride wherein at least 65 weight percent of the copolymer comprises vinylidene chloride.

19. A method according to claim 14 wherein said oxygen barrier layer comprises a copolymer of vinylidene chloride and methyl methacrylate.

20. A method according to claim 16 wherein said oxygen barrier layer comprises between about 70 and 95 weight percent of vinylidene chloride.

21. A method according to claim 14 wherein said oxygen barrier layer comprises ethylene-vinyl alcohol copolymer.

22. A method according to claim 14 wherein said oxygen barrier layer comprises a copolymer of vinylidene chloride and acrylonitrile.

23. A method according to claim 14 wherein said oxygen barrier layer is a copolymer having at least 65 weight percent of said copolymer derived from vinylidene chloride.

24. A method according to claim 23 wherein from 70 to about 95 weight percent of said copolymer is derived from vinylidene chloride.

25. A method according to claim 1, wherein said alpha-olefin comprises butene-1.

26. A method according to claim 1, wherein said alpha-olefin comprises hexene-1.

27. A method according to claim 1, wherein said alpha-olefin comprises octene-1.

28. A method according to claim 1, wherein said density is from about 0.86 g/cm$^3$ to about 0.90 g/cm$^3$.

29. A method according to claim 1, wherein said density is from about 0.90 g/cm$^3$ to about 0.91 g/cm$^3$.

30. A method according to claim 1, wherein said 1% secant modulus is from about 600 KPa to about 100,000 kPa.

31. A method according to claim 1, wherein said 1% secant modulus is from about 100,000 KPa to about 140,000 kPa.

32. A method according to claim 1, wherein said VLDPE has an $M_w/M_n$ of from about 2.7 to about 6.5.

33. A method according to claim 1, wherein said VLDPE has an $M_w/M_n$ of from about 2.9 to about 4.8.

34. A method according to claim 1, wherein said VLDPE has a melt flow ratio of from about 22 to about 40.

35. A method according to claim 1, wherein said VLDPE has a melt flow ratio of from about 26 to about 35.

36. A method according to claim 1, wherein said film has an elongation at break value of at least about 400%.

37. A method according to claim 1, wherein said film has a tensile strength of at least about 7650 psi (537 Kg/cm$^2$).

38. A method according to claim 11, wherein said melt index is from about 0.2 g/10 minutes to about 4.0 g/10 minutes.

39. A method according to claim 11, wherein said melt index is from about 0.14 g/10 minutes to about 0.92 g/10 minutes.

40. A method according to claim 1, wherein said film consists essentially of said VLDPE copolymer.

41. A method according to claim 1, wherein said VLDPE has a melting point of at least 116° C.

42. A method according to claim 1, wherein said VLDPE has 6 mole percent or more of its polymer units derived from $C_4$ to $C_8$ alpha-olefin.

43. A method according to claim 1, wherein said film is cross-linked.

44. A method according to claim 1, wherein said film is biaxially stretched below the melting point of the VLDPE.

45. A method according to claim 1, wherein said VLDPE is biaxially stretched at a temperature of from about 15°–50° F. (8°–28° C.) below the melting point of the VLDPE.

46. A method according to claim 1, wherein said VLDPE is biaxially oriented at a temperature between 88° to 108° C.

* * * * *

UNITED STATES PATENT AND TRADEMARK OFFICE
CERTIFICATE OF CORRECTION

PATENT NO. : 5,256,351
DATED : OCTOBER 26, 1993
INVENTOR(S) : Stanley Lustig, et al It is certified that error appears in the above-identified patent and that said Letters Patent is hereby corrected as shown below:

On the Title Page, at the [*] Notice, second line, delete "Dec. 31, 2008" and insert --March 27, 2007--.

Column 17, line 49, delete "polymer" and insert --copolymer--.

Column 18, line 57, after "layer" insert --copolymer--.

Signed and Sealed this

Tenth Day of January, 1995

Attest:

BRUCE LEHMAN

*Attesting Officer*     *Commissioner of Patents and Trademarks*